Feb. 25, 1958 K. E. BUCKMAN 2,824,622
GAS FILTER
Filed Oct. 26, 1954 3 Sheets-Sheet 1
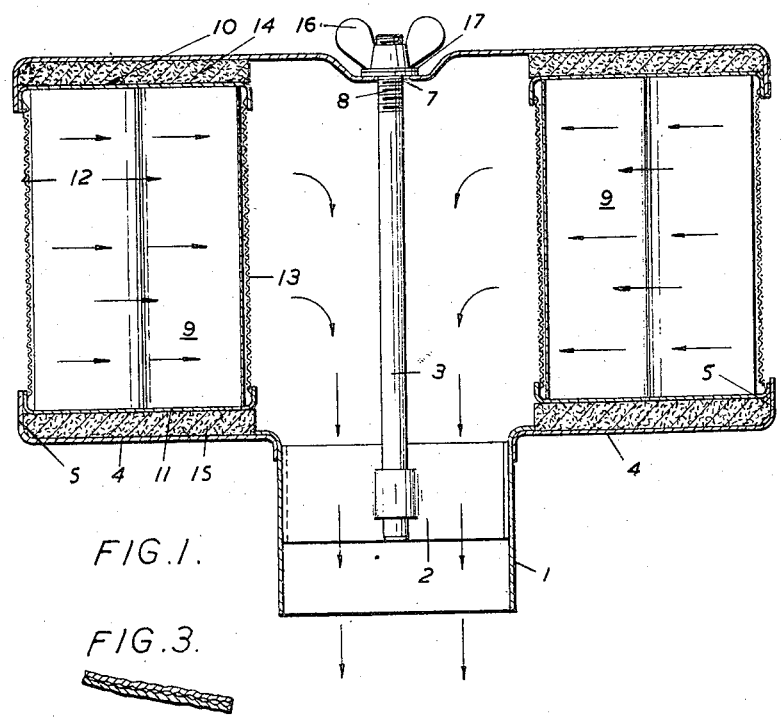
FIG.1.
FIG.3.
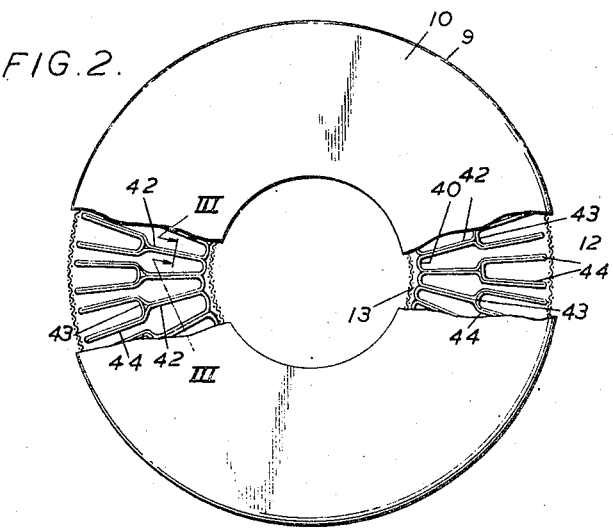
FIG.2.
Inventor
Kenneth Ernest Buckman
By
Attorney

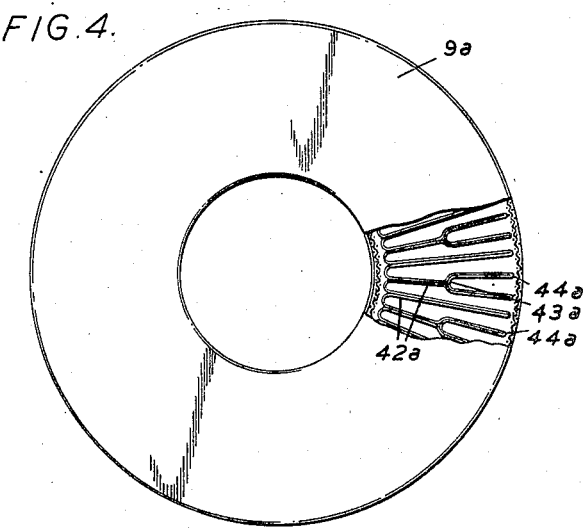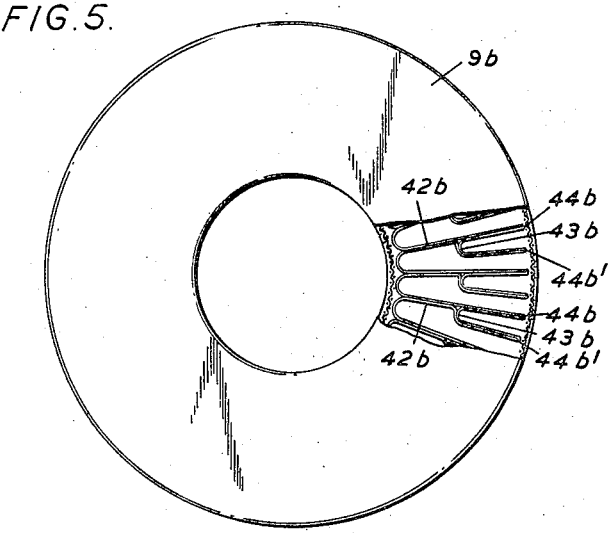

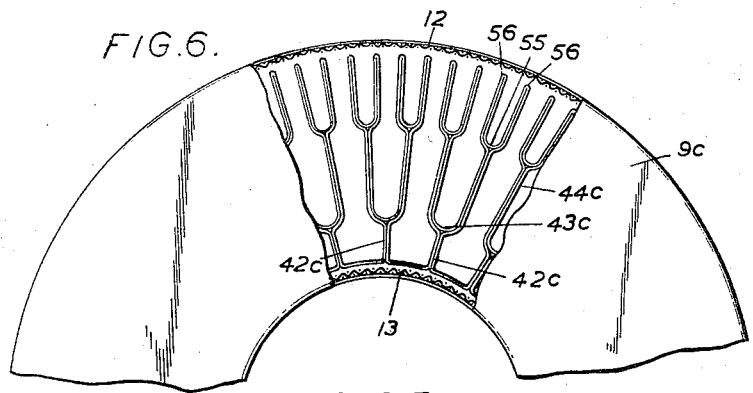
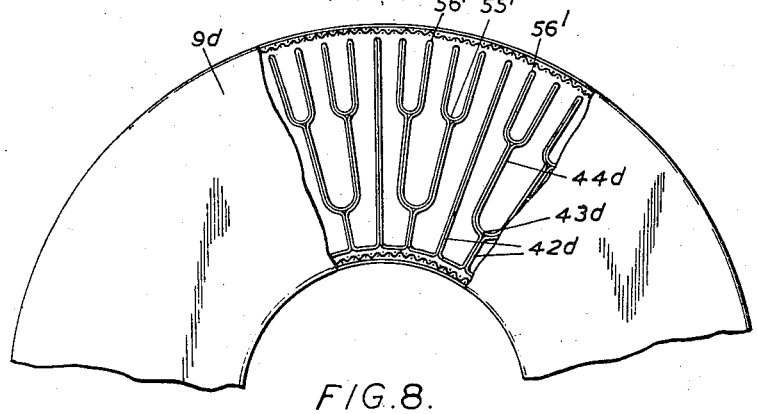
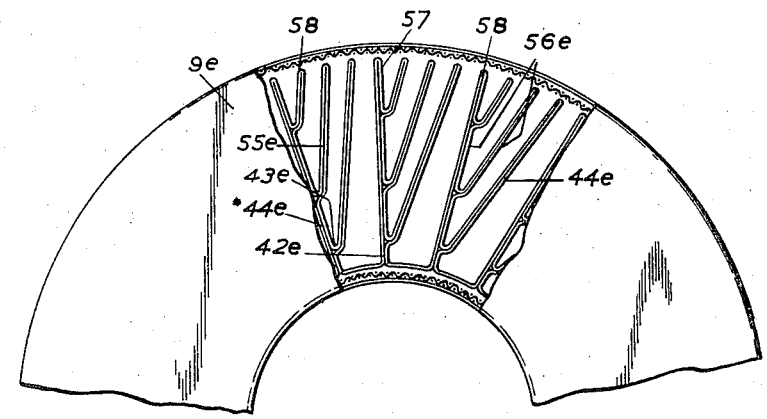

United States Patent Office 2,824,622
Patented Feb. 25, 1958

2,824,622

GAS FILTER

Kenneth Ernest Buckman, Redbridge, Southampton, England, assignor to General Motors Corporation, Detroit, Mich., a corporation of Delaware Application October 26, 1954, Serial No. 464,815

Claims priority, application Great Britain
November 14, 1953

2 Claims. (Cl. 183—71)

This invention relates to filters for gases and particularly to those having sheet filtering material which is folded and formed into an element having a series of double-wall, radially disposed folds spaced about a central longitudinal channel, so that in cross-section the filter element somewhat resembles the spokes of a wheel or a star.

The general object of the invention is to increase the effective filter area for a given volume of filter and thereby to increase the filter efficiency of a given size of filter.

This is effected by forming the outer edge of the double walls of a fold with one or more secondary folds of reentrant form.

Thus there may be one secondary re-entrant fold of a main fold extending radially inwardly say one half of the radial depth of the main fold. In cross-section such folds have the general form of a Y.

Another form of filter has a series of two or more such re-entrant folds successively of increasing radial depth.

A further form incorporates a main secondary re-entrant fold of a radial depth of say two-thirds of that of a main fold, and two tertiary folds one in each limb formed by the secondary fold, of a depth of say one third of that of a main fold. In cross-section such folds can have the form of a Y with each ascendent of the Y being a Y itself. Alternatively the secondary and tertiary folds can be formed like the branches of a tree extending radially outwardly of the main fold.

These secondary, or secondary and tertiary folds, can be formed in each main fold or in alternate main folds, or, for example, in one in ever three or four main folds.

By such formations of folds, the thickness of the filtrate builds up on the outside of the sheet material in a more uniform manner than with the usual star-shaped filter, more use is made of the outer parts of the V-shaped pockets formed by the main folds by the formation of secondary folds and the diameter of the unused inner space can thereby be decreased to a minimum.

The sheet filtering material can, for example, be paper, woven fibrous material, cellular fibrous material or the like.

A particular application of a filter embodying the present invention is to air cleaners for internal combustion engines.

The scope of the invention is defined by the appended claims; and how it can be carried into effect is hereinafter particularly described with reference to the accompanying drawings in which:

Fig. 1 is an elevation partly in section of an air cleaner unit including a filter element embodying the invention;

Fig. 2 is a plan, partly in section of the filter element of the unit of Fig. 1;

Fig. 3 is a section on line III—III of Fig. 2;

Fig. 3A is an enlarged modified detail of Fig. 2;

Fig. 4 is a plan, partly in section of a modified form of filter element embodying the invention;

Fig. 5 is a plan, partly in section, of another modified form of filter element embodying the invention;

Fig. 6 is a plan, partly in section, of another modified form of filter element embodying the invention;

Fig. 7 is a plan, partly in section, of yet another modified form of filter element embodying the invention; and Fig. 8 is a plan, partly in section, of yet another modified form of filter element embodying the invention.

The air cleaner unit shown in Figure 1 comprises an outlet tube 1 adapted to be secured to an internal combustion engine air intake (not shown). Across the tube 1 is welded a diametral bracket 2 which carries a co-axial rod 3. The tube 1 has welded thereto externally an annular end plate 4 which has an upturned flange 5 at its outer periphery. The upper part of the cleaner is colsed by a circular end plate 6 having a central aperture 7 through which passes the upper threaded end 8 of rod 3.

Between end plates 4 and 6 is supported an annular paper filter element 9 enclosed by upper and lower annular filter end plates 10 and 11 and by outer and inner cylindrical wire mesh screens 12 and 13. Between the end plate 6 and filter end plate 10 is an annular felt or other resilient, sound absorbing pad 14; and between the end plate 4 and filter end plate 11 is a similar pad 15.

The unit is held together by the longitudinal clamping effect of a butterfly nut 16 screwed onto the threaded end 8 of the rod 3. A spring washer 17 is interposed between the butterfly nut 16 and end plate 6.

The filter element 9 shown in Figures 1, 2 and 3 compries a sheet of filtering material 40, preferably a porous paper impregnated with a phenol formaldehyde or like resin, which is folded and formed round the inner cylindrical screen wall 13 to form a series of double-wall radially disposed folds 42 so that in cross section (Figure 2) the folds 42 resemble the spokes of a wheel. The double folds are slightly spaced apart as shown in Figure 3. The adjacent layers and folds of paper can if desired be spaced by dimples as shown in Figure 3A. Each fold 42 has a secondary fold 43 of re-entrant form which, in effect, bifurcates each "spoke" so that each fold 43 has two radially extending branch folds 44. The material 40 is formed adjacent the inner screen wall 13 (Figure 2) so as to space adjacent walls of the folds 42 apart.

The upper and lower ends of the folds of element 9 are sealed by adhesive which seals them to and between the annular end plates 10 and 11 respectively. Alternatively the ends of the material can be sealed by adhesive, or crimping.

The filter element $9a$ in the modification shown in Figure 4, is of similar construction to element 9 of Figures 1 to 3 except that only alternate folds $42a$ have secondary folds $43a$ and branch folds $44a$.

The filter element $9b$ of the modification shown in Figure 5 has folds $42b$ in which are secondary folds $43b$ so arranged that the branches $44b$ and $44b^1$ are set at an angle, one branch $44b$ continuing in the direction of the radius on which lies fold $42b$ and the other branch $44b^1$ being at a small angle to that radius.

The filter element $9c$ of the modification shown in Figure 6 has folds $42c$ which have secondary folds $43c$ arranged to form branch folds $44c$. The branch folds $44c$ in turn have tertiary folds 55 forming branches 56, the tertiary folds 55 being formed at points radially outward of the secondary folds $43c$.

The filter element $9d$ of the modification shown in Figure 7 has folds $42d$ alternate ones of which have secondary folds $43d$ arranged to form branch folds $44d$, which branch folds have in turn tertiary folds $55^1$ forming branches $56^1$.

The filter element 9e of the modification shown in Figure 8 has folds 42e which are on radii of the element 9e and secondary folds 43e which form branch folds 44e at an angle to the radius on which the respective fold 42e lies. Alternate branch folds 44e have tertiary folds 55e which have branches 56e. Alternate branches 56e have quaternary folds 57 which form branches 58.

Air flow through the filter is indicated by the arrows in Figure 1 and it is clear from the direction of flow that impurities will collect in the spaces between adjacent folds and in the spaces between the branches of secondary and tertiary folds.

The filter particularly described has special utility as an air intake filter for internal combustion engines.

I claim:

1. A filter element comprising an elongated sheet of filter material formed transversely of the length thereof to provide spaced folds and formed throughout the length thereof to provide an annular filter, the oppositely disposed parts of said sheet forming said folds being formed within said folds to provide spaced dimples providing supporting means, said oppositely disposed parts of said sheet being supported in engagement with one another by said dimples and providing continuous passage means within said folds in open communication with one side of said filter, said sheet on the surfaces thereof between said folds being spaced throughout the entire extent of said folds and being in open communication with the other side of said filter, certain folds of said folds being similarly formed to provide diverging branches dividing said certain folds between the extremities thereof and decreasing and tending to equalize the spacing between said certain folds and adjacent folds, and end plate means engaging the opposite edges of said sheets and said folds and retaining the parts of said filter in said formed relation.

2. A filter element comprising a pair of spaced and continuous screen wall means disposed one within the other to provide an annular filter chamber therebetween, an elongated sheet of filter material formed transversely of the length thereof to provide spaced folds and formed throughout the length thereof to provide an annular filter disposed within said filter chamber, the oppositely disposed parts of said sheet forming said folds being formed within said folds to provide spaced supporting means, said oppositely disposed parts of said sheet being supported in engagement with one another by said supporting means and providing continuous passage means within said folds in open communication with one side of said filter, said sheet on the surfaces thereof between said folds being spaced throughout the entire extent of said folds and being in open communication with the other side of said filter, certain folds of said folds being similarly formed to provide diverging branches dividing said certain folds between the extremities thereof and decreasing and tending to equalize the spacing between said certain folds and adjacent folds, and end plate means engaging the ends of said wall means and the opposite edges of said sheets and said folds and retaining the parts of said filter in said formed relation.

References Cited in the file of this patent

UNITED STATES PATENTS

| | | |
|---|---|---|
| 1,580,291 | Dollinger | Apr. 13, 1926 |
| 2,569,243 | Kovacs | Sept. 25, 1951 |
| 2,732,031 | Rabbitt et al. | Jan. 24, 1956 |

FOREIGN PATENTS

| | | |
|---|---|---|
| 101,860 | Sweden | Apr. 24, 1941 |
| 295,379 | Switzerland | Mar. 1, 1954 |
| 329,099 | Great Britain | May 15, 1930 |